US012683233B2

(12) United States Patent
Le et al.

(10) Patent No.: US 12,683,233 B2
(45) Date of Patent: Jul. 14, 2026

(54) PRISMATIC BATTERY CELL SEPARATOR AND MODULE USING SAME

(71) Applicant: FLEX-N-GATE ADVANCED PRODUCT DEVELOPMENT, LLC, Warren, MI (US)

(72) Inventors: Daniel Le, Grafton, WI (US); Jack Bekou, Windsor (CA); Paul Martini, Tecumseh (CA)

(73) Assignee: FLEX-N-GATE ADVANCED PRODUCT DEVELOPMENT, LLC, Warren, MI (US)

( * ) Notice: Subject to any disclaimer, the term of this patent is extended or adjusted under 35 U.S.C. 154(b) by 837 days.

(21) Appl. No.: 17/876,889

(22) Filed: Jul. 29, 2022

(65) Prior Publication Data

US 2023/0033443 A1 Feb. 2, 2023

Related U.S. Application Data

(60) Provisional application No. 63/227,917, filed on Jul. 30, 2021.

(51) Int. Cl.
| | |
|---|---|
| *H01M 50/291* | (2021.01) |
| *H01M 10/643* | (2014.01) |
| *H01M 10/647* | (2014.01) |
| *H01M 10/653* | (2014.01) |
| *H01M 10/6555* | (2014.01) |

(Continued)

(52) U.S. Cl.
CPC ....... *H01M 50/291* (2021.01); *H01M 10/647* (2015.04); *H01M 10/653* (2015.04); *H01M 10/6555* (2015.04); *H01M 50/209* (2021.01);

*H01M 50/242* (2021.01); *H01M 50/262* (2021.01); *H01M 50/293* (2021.01);
(Continued)

(58) Field of Classification Search
CPC ............ H01M 50/291; H01M 50/209; H01M 50/242; H01M 50/262; H01M 50/293; H01M 50/211; H01M 50/213; H01M 50/233; H01M 10/647; H01M 10/653; H01M 10/6555; H01M 10/643; H01M 10/658
See application file for complete search history.

(56) References Cited

U.S. PATENT DOCUMENTS

| | | | |
|---|---|---|---|
| 2009/0061299 A1* | 3/2009 | Uchida ............... | H01M 10/625 429/156 |
| 2009/0111010 A1* | 4/2009 | Okada ............... | H01M 10/6563 429/120 |

(Continued)

*Primary Examiner* — Matthew W Van Oudenaren
(74) *Attorney, Agent, or Firm* — Foley & Lardner LLP

(57) ABSTRACT

A battery module includes a first side rail, a second side rail, one or more battery cell banks, and one or more battery cell separators. The one or more battery cell banks are positioned between the first side rail and the second side rail. The one or more battery cell separators are positioned within the one or more battery cell banks and configured to separate one or more battery cells positioned adjacent one another. The one or more battery cell separators include one or more cell barriers and a support structure. The one or more cell barriers are positioned adjacent the one or more battery cell banks. The support structure is positioned between the one or more cell barriers. The one or more battery cell separators are configured to propagate thermal energy produced from the one or more battery cells.

20 Claims, 13 Drawing Sheets

(51) Int. Cl.

| | |
|---|---|
| *H01M 50/209* | (2021.01) |
| *H01M 50/211* | (2021.01) |
| *H01M 50/213* | (2021.01) |
| *H01M 50/242* | (2021.01) |
| *H01M 50/262* | (2021.01) |
| *H01M 50/293* | (2021.01) |

(52) U.S. Cl.
CPC ........ *H01M 10/643* (2015.04); *H01M 50/211*
(2021.01); *H01M 50/213* (2021.01)

(56) References Cited

U.S. PATENT DOCUMENTS

| | | | | |
|---|---|---|---|---|
| 2013/0288099 A1* | 10/2013 | Kim | ..................... | H01M 50/30 |
| | | | | 429/120 |
| 2014/0356664 A1* | 12/2014 | Jung | ................... | H01M 50/291 |
| | | | | 429/82 |
| 2016/0036020 A1* | 2/2016 | Gunna | ................ | H01M 50/249 |
| | | | | 429/99 |

* cited by examiner

PRISMATIC BATTERY CELL SEPARATOR AND MODULE USING SAME

CROSS-REFERENCE TO RELATED PATENT APPLICATION

This application claims the benefit of and priority to U.S. Provisional Patent Application No. 63/227,917, filed Jul. 30, 2021, the entire disclosure of which is incorporated by reference herein.

BACKGROUND

The present disclosure relates generally to the field of battery modules. More specifically, this application relates to structures for separating adjacent prismatic lithium-ion cells in a battery module while providing additional functionality such as heat dissipation, structural support, etc. Such structures may also allow for improved modularity for the battery modules, allowing capacity of the module to be scaled up or down easily.

Battery modules for use in automotive applications typically include a large number of individual batteries or cells. These cells are electrically coupled to each other to provide power for the vehicle during operation. The number of cells may vary depending on a number of factors, including the desired range of the vehicle and other criteria.

The modules typically include structures or features to secure the various cells in place in a desired manner. It would be advantageous to provide an improved configuration for such structures/features. For example, it would be advantageous to employ structures in the module that could serve more than one function. These and other advantages will be apparent to those reviewing the present disclosure.

SUMMARY

At least one embodiment of the present application relates to a battery module. The battery module includes a first side rail, a second side rail, one or more battery cell banks, and one or more battery cell separators. The one or more battery cell banks are positioned between the first side rail and the second side rail. The one or more battery cell separators are positioned within the one or more battery cell banks and configured to separate one or more battery cells positioned adjacent one another. The one or more battery cell separators include one or more cell barriers and a support structure. The one or more cell barriers are positioned adjacent the one or more battery cell banks. The support structure is positioned between the one or more cell barriers. The one or more battery cell separators are configured to mitigate thermal energy propagation produced from the one or more battery cells.

At least one embodiment relates to a cell separator. The cell separator includes a plurality of sidewalls, a first cell barrier, a second cell barrier, and a support structure. The first cell barrier is configured to abut a first battery cell and extends perpendicular from one of the plurality of sidewalls. The second cell barrier is configured to abut a second battery cell and extends perpendicular from another one of the plurality of sidewalls. The support structure is positioned between the first cell barrier and the second cell barrier. The support structure includes a male portion coupled to a first side of the support structure and a female portion coupled to a second side of the support structure, the first side opposite the second side.

At least one embodiment of the present application relates to a battery module. The battery module includes a plurality of side rails, one or more battery cell banks, and one or more battery cell separators. The one or more battery cell banks are positioned between the plurality of side rails. The one or more battery cell banks include one or more battery cells positioned therein. The one or more battery cell separators are positioned within the one or more battery cell banks and are configured to separate the one or more battery cells positioned adjacent one another. The one or more battery cell separators include a plurality of sidewalls, one or more cell barriers, a bottom support, a support structure, and one or more flanges. The one or more cell barriers are positioned adjacent the one or more battery cell banks. The bottom support extends along a portion of a length of the battery cell separator and extends outward from the one or more cell barriers. The support structure is positioned between the one or more cell barriers. The one or more flanges extend from the support structures. The one or more flanges, the bottom support, the first cell barrier, and the plurality of sidewalls cooperatively define an area for a battery cell to be positioned therein.

This summary is illustrative only and is not intended to be in any way limiting. Other aspects, inventive features, and advantages of the devices and/or processes described herein, as defined solely by the claims, will become apparent in the detailed description set forth herein, taken in conjunction with the accompanying figures, wherein like reference numerals refer to like elements.

DETAILED DESCRIPTION

Before turning to the FIGURES, which illustrate the example embodiments in detail, it should be understood that the present application is not limited to the details or methodology set forth in the description or illustrated in the figures. It should also be understood that the terminology used herein is for the purpose of description only and should not be regarded as limiting.

As will be discussed in greater detail below, according to an exemplary embodiment, a battery module may include cell separators intended for retention of battery cells and separation of such cells from adjacent cells. The cell separators may also advantageously provide thermal separation of adjacent cells and may also act as a heat sink to route heat away from cells and/or to provide cooling to the cells to which they are attached. Additionally, the cell separators may include features intended to provide structural rigidity to the battery module. Still further, the cell separators may include one or more features that may be used to couple them to adjacent cell separators to allow for the modular assembly of the battery module and which make scaling the capacity of the battery module relatively simple and efficient.

Referring generally to the FIGURES, a battery module 100 is shown according to various embodiments. The battery module 100 is configured for use vehicle, homes, outdoor equipment, etc. The battery module 100 as shown includes two side rails, two end rails, a plurality of cell separators, and a plurality of battery cells that are retained within the module and separated from adjacent battery cells by the cell separators. According to various embodiments, the battery module 100 may include different numbers of cell separators and battery cells disposed within so as to create a customizable battery module design.

The cell separators may be configured to act as a thermal barrier and as a support structure. For example, the cell separators may be configured to mitigate thermal propagation and heat dissipation within the battery module so as to prevent the battery cells from overheating or potentially damaging one another.

Figure 1:
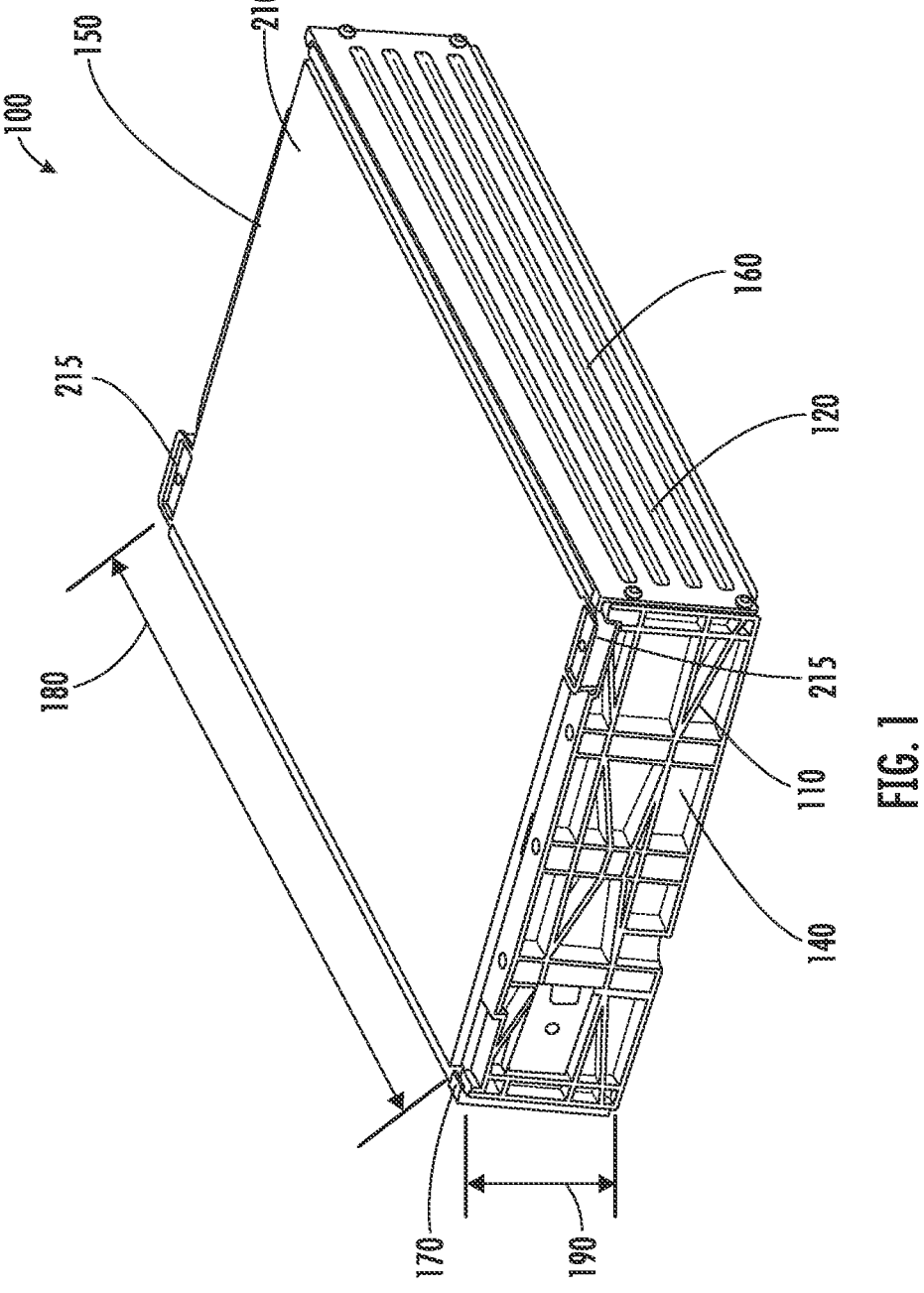
FIG. 1 is a perspective view of a battery module, according to an exemplary embodiment.

Referring to FIG. 1, a perspective view of a battery module 100 is shown according to an example embodiment. The battery module 100 comprises two end rails 110 (one is visible, and the other would be at the opposite end of the module) and two side rails 120 (again, one is visible, and the other would be at the opposite side). The end rails 110 include a first end rail 140 and a second end rail 150. The side rails 120 include a first side rail 160 and a second side rail 170. The battery module 100 is configured to be rectangular in shape. In some embodiments, the battery module 100 may be any geometrical configuration (e.g., circular, square, triangular, etc.).

The battery module 100 includes a length, shown as battery module length 180, a height, shown as battery module height 190, and a width, shown as battery module width 200. The battery module length 180 may be the length of the battery module 100, parallel to the two side rails 120. The battery module height 190 may be the height of the two end rails 140 and 150. In some embodiments, the battery module height 190 may be a height greater than the height of the two end rails 140 and 150. The battery module width 200 may be the length of the battery module 100, parallel to the two end rails 140 and 150. By way of example, the battery module length 180 may be greater than both the battery module height 190 and the battery module width 200. In some embodiments, the battery module height 190 may be greater than both the battery module length 180 and the battery module width 200. In still some embodiments, the battery module width 200 may be greater than both the battery module length 180 and the battery module height 190.

The battery module 100 further includes a battery module cover 210 positioned above at least one of the end rails 140 and 150 and the two side rails 120. The battery module cover 210 may be configured to cover the battery module 100 such to prevent exposure of material disposed within (e.g., battery cells, electrical wires, etc.). In some embodiments, the battery module cover 210 may be configured to support other components of the battery module (e.g., electrical wiring, etc.). The battery module cover 210 may be rectangular in shape such to cover the entirety of the battery module 100. In some embodiments, the battery module cover 210 may be a plurality of geometrical configurations that cover at least a portion of the battery module 100.

Figure 2:
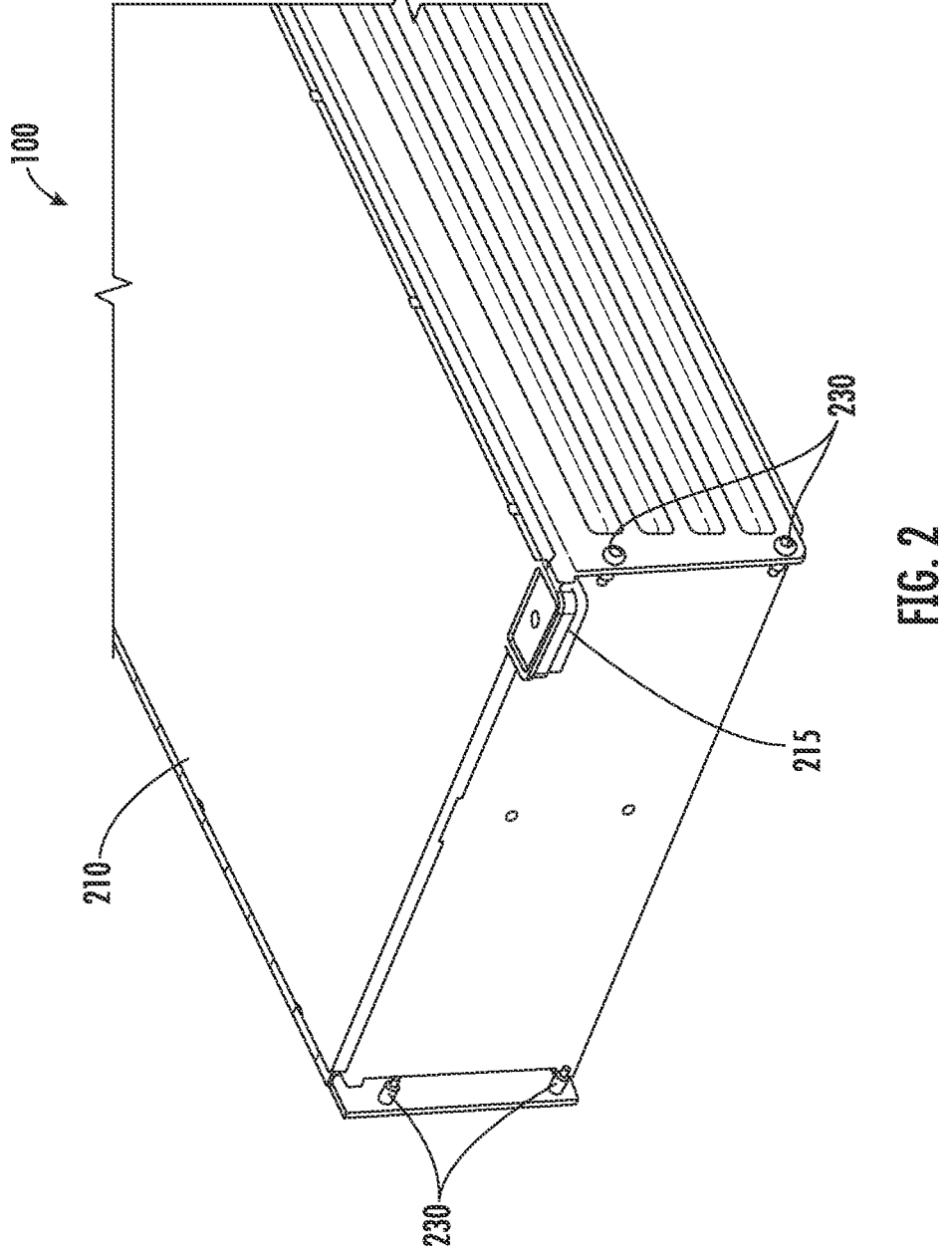
FIG. 2 is a detailed perspective view of the battery module of FIG. 1, according to an exemplary embodiment.

Referring now to FIGS. 1 and 2, a perspective view of a portion of the battery module 100 is shown. The battery module 100 further comprises an electrical terminal 215 coupled to the battery module cover 210. To be more precise, the electrical terminal 215 may be coupled to one of a positive or negative battery cell by way of bus bars, etc. By way of example, the battery module 100 may include two electrical terminals 215, positioned opposite one another on the battery module cover 210. In such an embodiment, each of the electrical terminals 215 may be associated with an individual bank of battery cells, or the like. In still such an embodiment, the two electrical terminals 215 may be one of a positive electrical terminal and a negative electrical terminal, where the positive electrical terminal is operably coupled a positive terminal of battery cells and the negative electrical terminal is operably coupled to a negative terminal of battery cells. In some embodiments, the battery module 100 may include a proportionate amount of electrical terminals 215 as are banks of battery cells. For example, if the battery module 100 includes four banks of battery cells, the battery module 100 includes four electrical terminals 215.

Figure 3:
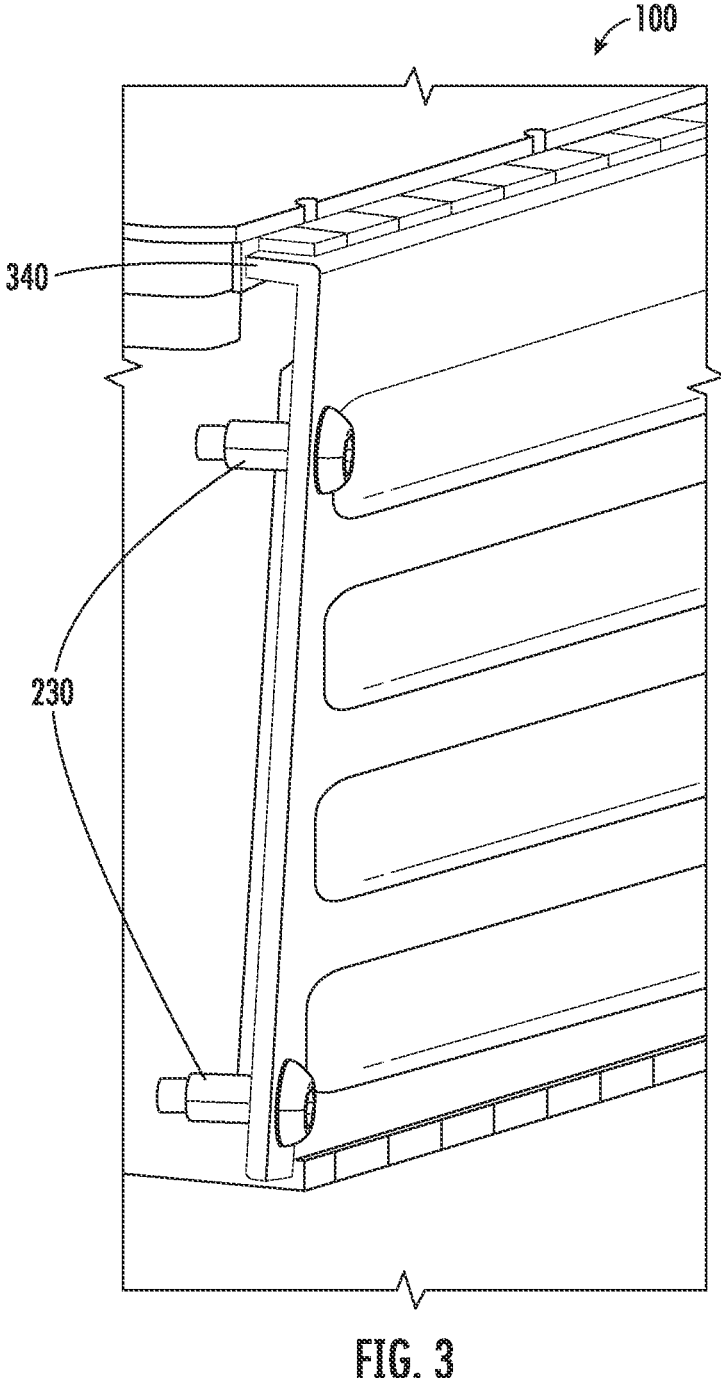
FIG. 3 is a detailed perspective view of the battery module of FIG. 2, according to an exemplary embodiment.

Referring specifically to FIGS. 2 and 3, the battery module 100 further comprises fasteners 230. The fasteners 230 may be configured to couple the two end rails 140 and 150 to the two side rails 120. The fasteners 230 may be disposed between both the two end rails 140 and 150 and the two side rails 120 such that a face of the fasteners 230 (e.g., head, etc.) is exposed and accessible by a user. According to an example embodiment, the battery module 100 includes eight fasteners 230 configured to couple the two end rails 140 and 150 to the two side rails 120. The fasteners 230 may be screws, bolts, snaps, pins, or the like. When the fasteners 230 are fully fastened, the face of the fasteners 230 may be fully seated within the two side rails 120 such that the fasteners 230 do not protrude out from a face of the two side rails 120. In some embodiments, when the fasteners 230 are fully fastened, the fasteners 230 may protrude out from the face of the two side rails 120. According to other exemplary embodiments, a different number of fasteners may be employed in the module.

Figure 4:
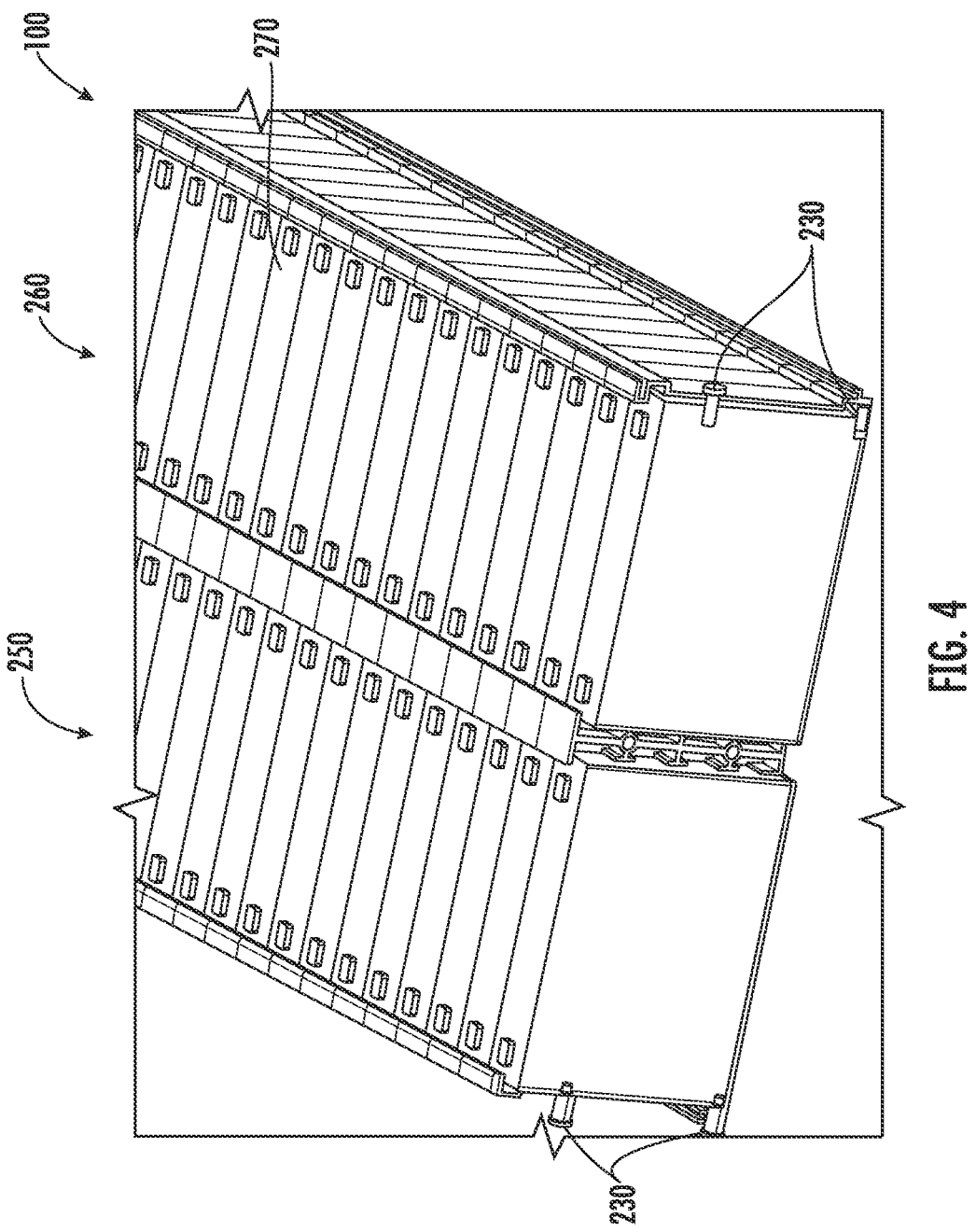
FIG. 4 is a perspective view of the battery module of FIG. 1, according to an exemplary embodiment.

As shown in FIG. 4, the battery module 100 comprises a plurality of battery cell banks, shown as first battery cell bank 250 and second battery cell bank 260. The battery cell banks 250 and 260 may be disposed within the battery module 100 and may extend along at least a portion of the battery module length 180. In some embodiments, the battery cell banks 250 and 260 may extend along at least a portion of the battery module width 200. The battery cell banks 250 and 260 may comprise a plurality of battery cells 270. Within the respective battery cell banks 250 and 260, battery cells 270 may be positioned along a similar contact plane such to have a uniform configuration. In some embodiments, the battery cells 270 may have a staggered position within the respective battery cell banks 250 and 260. The maximum number of battery cells 270 that the battery module 100 may comprise is determined upon the battery module length 180. In some embodiments, the battery module 100 may comprise less than the maximum number of battery cells 270.

Figure 5:
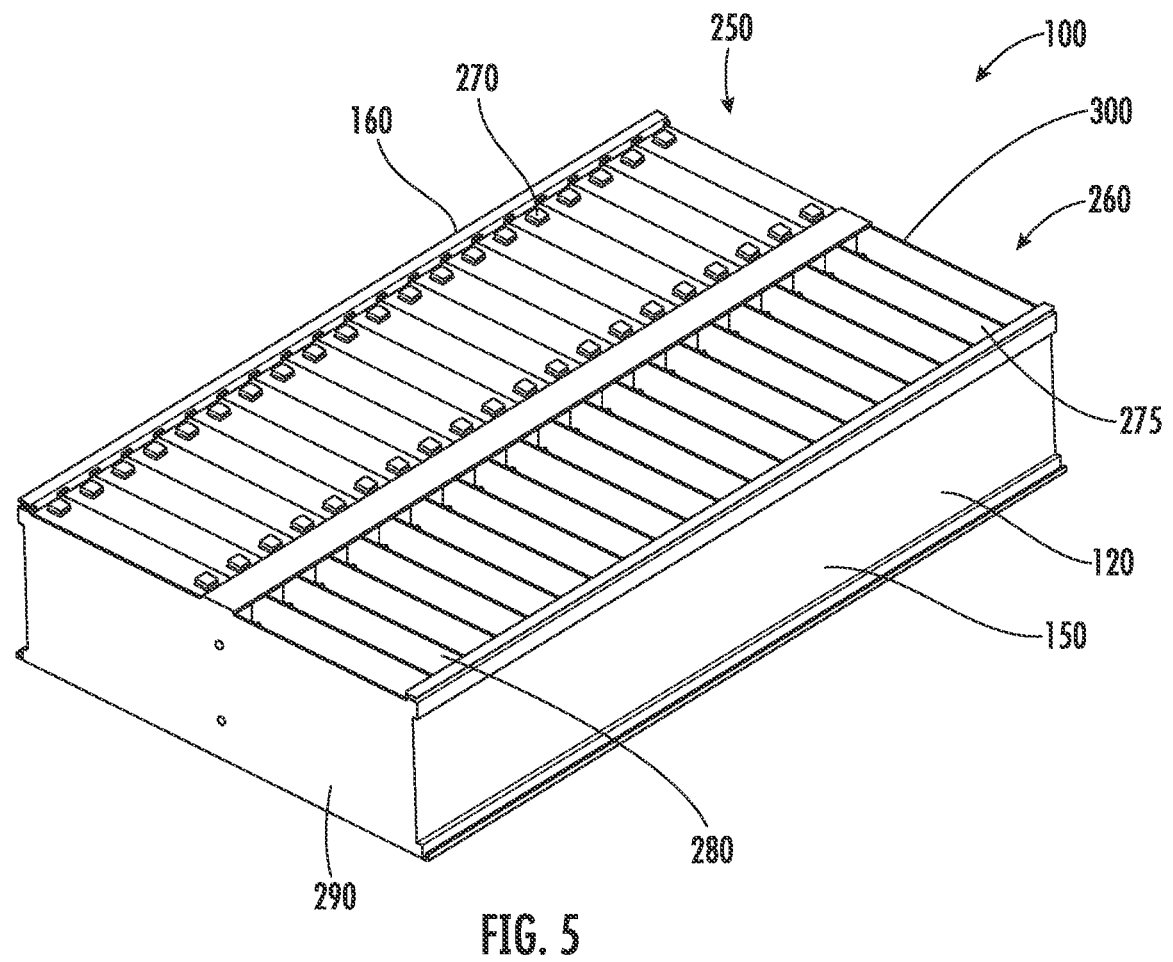
FIG. 5 is a perspective view of the battery module of FIG. 4, according to an exemplary embodiment.

Referring now to FIG. 5, the battery module 100 is shown battery cells 270 only within the first battery cell bank 250, and the second battery cell bank 260 is shown as including a plurality of open slots 275 where battery cells 270 could be located. The slots 275 may be slightly larger than the battery cells 270 such that the battery cells 270 may be tightly retained when the battery module 100 is assembled. Positioned between the two side rails 120, parallel to the two end rails 140 and 150, is a plurality of cell separators, shown as cell separators 280. It should be noted that the term "cell separator" as used herein is distinct from separators that would be used within individual battery cells to separate adjacent anodes and cathodes; here, the term "cell separator" is used to denote a structure that separates adjacent cells from one another. The cell separators 280 may be configured to form the plurality of slots 275 by forming a surrounding structure.

The cell separators 280 may be positioned so as to separate adjacent cells within the first battery cell bank 250 and the second battery cell bank 260. By way of example, the cell separators 280 may be disposed between each of the battery cells 270 to eliminate the potential for the battery cells 270 to come into contact with one another. The cell separators 280 may be manufactured using injection molding manufacturing methods (e.g., plastic injection molding, etc.). The cell separators 280 may be manufactured out of a plastic material. According to some embodiments, the cell separators may be thermally conductive (e.g., they may be made from a thermally conductive plastic that has conductive particles or fibers such as carbon fiber or metal incorporated therein, they may be formed from plastic and may include an integrated thermal shield, they may be formed from composite sheets, etc.).

The cell separators 280 may be further configured to promote a "Cell to Pack" approach. The "Cell to Pack" approach is a method of directly integrating the battery cells 270 into the battery module 100 without the need for additional modules. As can be appreciated, eliminating unnecessary or unneeded material can allow for at least one of (a) reduce the overall weight of the battery module 100, (b) reduce the overall size of the battery module 100, and (c) allow additional space for alternate features.

The battery module 100 further comprises a plurality of end plates positioned proximate to the ends of the battery module 100, shown as first end plate 290 and second end plate 300. The plurality of end plates 290 and 300 may be configured to be dimensionally similar to the cell separators 280. To be more precise, the plurality of end plates 290 and 300 may be a cell separator 280 that has a smooth surface extending about an entire length of the plurality of end plates 290 and 300. The smooth surface of the plurality of end plates 290 and 300 may be configured to abut at least one of the two end rails 140 and 150. In some embodiments, the plurality of end plates 290 and 300 may be the same as the two end rails 140 and 150.

Figure 6:
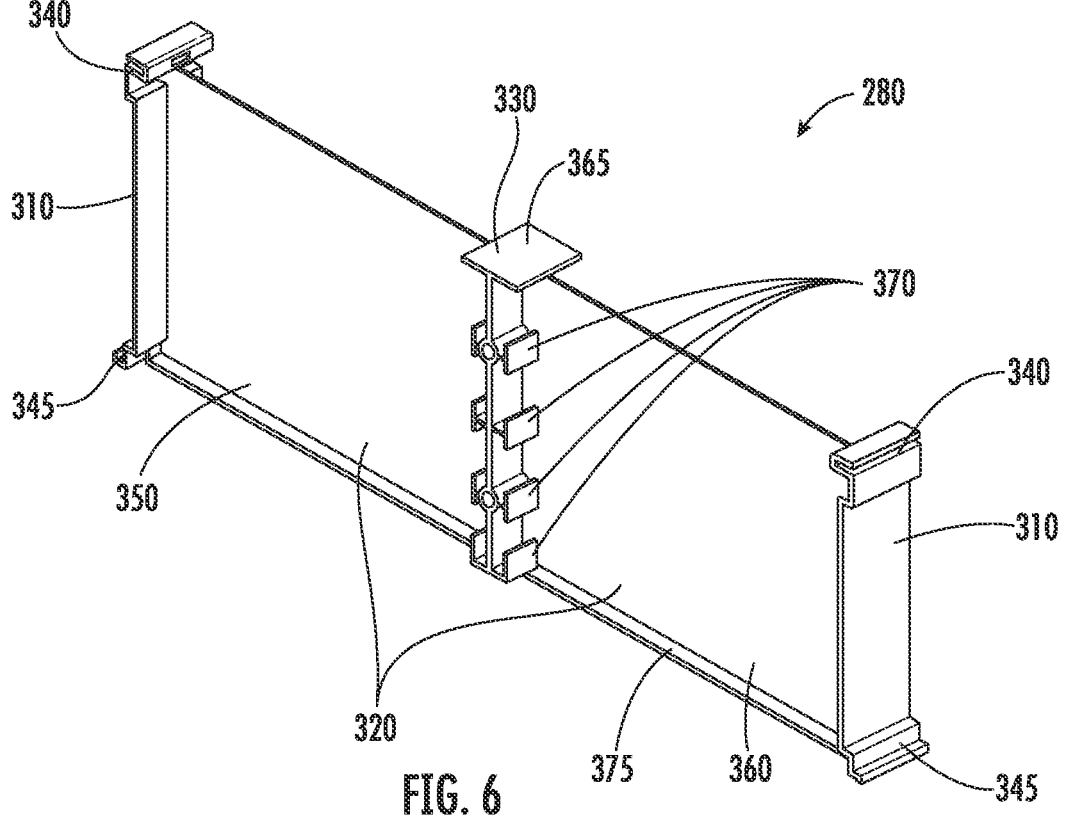
FIG. 6 is a perspective view of a cell separator of FIG. 5, according to an exemplary embodiment.

Referring now to FIG. 6, a perspective view of the cell separator 280 is shown. The cell separator 280 includes a plurality of sidewalls, shown as sidewalls 310, a cell barrier 320 disposed between the sidewalls 310, and a support structure 330. The sidewalls 310 may be positioned on opposite ends of the cell separator 280 and may extend perpendicular to the cell barrier 320. A locking mechanism, shown as interlocking mechanism 340, is fixedly coupled to the sidewalls 310, proximate the top of the cell separator 280. The interlocking mechanism 340 may be configured to receive a portion of a side rail 120 to provide structural rigidity to the battery module 100. As shown in FIG. 3, a flange of a side rail 120 may be slidably coupled to a groove of the interlocking mechanism 340. In some embodiments, the side rail 120 may be coupled to the cell separator 280 by a joining mechanism (e.g., tongue and groove, click, latch, etc.) extending along at least a portion of the interlocking mechanism 340.

The cell separator 280 includes a front portion and a rear portion. The front portion of the cell separator 280 may be substantially similar to the rear portion of the cell separator 280. In some embodiments, the front portion of the cell separator 280 may include different features than the rear portion of the cell separator 280.

The sidewalls 310 further include a plurality of slots, shown as separator grooves 345. The separator grooves 345 may be configured to receive a portion of a side rail 120 that is coupled to the interlocking mechanism 340. According to an example embodiment, the separator grooves 345 are slidably coupled to the two side rails 120. In some embodiments, the separator grooves 345 are coupled to the two side rails 120 by alternate adjoining methods (e.g., latch, press-fit, etc.).

The cell barrier 320 may be a thin barrier wall that is configured to separate individual battery cells 270 from one another. According to an example embodiment, the cell separator 280 comprises a first cell barrier 350 and a second cell barrier 360. Each of the first cell barrier 350 and the second cell barrier 360 may be associated with one of the first battery cell bank 250 and the second battery cell bank 260. For example, the first battery cell bank 250 may only include battery cells 270 positioned between the first cell barrier 350 and, accordingly, the second battery cell bank 260 may only include battery cells 270 positioned between the second cell barrier 360. The first cell barrier 350 and the second cell barrier 360 may be configured to mitigate thermal energy propagation between the battery cells 270. By way of example, mitigation of thermal propagation occurs around the entire perimeter (e.g., x-direction, y-direction, and z-direction) of the battery cells 270. According to an exemplary embodiment, mitigation of thermal propagation occurs between neighboring battery cells 270 coupled to the same cell separator 280, and between battery cells 270 positioned adjacent one another and coupled to another cell separator 280. In some embodiments, the first cell barrier 350 and the second cell barrier 360 may be configured to promote heat dissipation within the battery module 100 such to provide a cooling effect. The cell barrier 320 may be manufactured (e.g., using injection molding, etc.) using at least one of a plurality of conductive materials (e.g., conductive plastics, thermal dissipation material, etc.) to promote thermal efficiency. Additionally, the cell barrier 320 may direct the thermal energy towards a heat sink (e.g., a cooling plate positioned proximate the bottom of the battery cell 270 and coupled to the cell separator 280, etc.). In some embodiments, the cell barrier 320 may be manufactured out of metallic materials (e.g., aluminum, steel, etc.).

According to an exemplary embodiment, the cell separator 280 may be configured to promote electrical isolation within the battery module 100. To be more precise, the cell separator 280 may reduce the potential of improper contact between the individual battery cells 270 to reduce the potential of shorting out at least one battery cell 270. Traditionally, battery cells 270 may have included a liner (e.g., metallic liner, insulated liner, etc.) to maintain energy storage within the battery cell 270 and to eliminate the potential of individual battery cells 270 shorting out by coming on contact with one another. In some embodiments, if the battery cells 270 are not properly assembled, arcing can occur between the battery cell 270 and a neighboring surface (e.g., another battery cell 270, metallic surface, etc.). The cell separator 280 mitigates at least one of (a) battery cell 270 shorting out and (b) battery cell 270 arcing by forming an individual barrier between each battery cell 270 in the battery module 100.

The support structure 330 may be a structure positioned along a vertical midpoint of the cell separator 280 (e.g., the support structure 330 separates the cell separator into two equal parts). The support structure 330 further includes a smooth flange or platform, shown as support structure platform 365. The support structure platform 365 may be configured to support a portion of the battery module cover 210, at the midpoint of the battery module cover 210. In some embodiments, the support structure platform 365 may be configured to provide structural rigidity to the battery cell 270.

The support structure 330 may be configured to provide (a) force dampening and (b) structural rigidity. By way of example, the support structure 330 may be configured to dampen forces (e.g., vibration, loading, impact, static, etc.) introduced to the battery module 100. To be more precise, the support structure 330 may be configured to dampen forces applied in at least one of the x-direction, y-direction, and z-direction. The support structures 330 may be further configured to withstand forces endured onto the battery module from external forces (e.g., force shock, crash, drop, crush, etc.). In such an embodiment, forces are routed, and dampened, through the support structures 330 instead of having direct contact with the battery cells 270.

The cell separator includes a plurality structures for retaining battery cells. For example, as shown in FIG. 6, the support structure 330 includes a number of flanges 370 extending therefrom, bottom walls 375, and the sidewalls 310. Together, the flanges 370, bottom walls 375, and sidewalls 310, as well as the cell barrier 320, each contact surfaces of the battery cells to retain such cell in place when assembled.

According to an example embodiment, the flanges 370 may be further configured to provide spacing between adjacent battery cells 270, which may also provide advantageous thermal separation. As shown in FIG. 6, the support structure 330 includes four flanges 370 substantially uniformly distributed along the length of the support structure 330. In some embodiments, the support structure 330 may include any number of flanges 370 needed to provide appropriate support to the battery module 100.

Referring still to FIG. 6, the cell separator 280 may be configured to advantageously provide at least one of decreased thermal prorogation and heat dissipation. Traditionally, battery cells 270 disposed within the battery module 100 are subject to high temperatures, with minimal methods of cooling. The cell separator 280, being disposed between battery cells 270, may have a lower temperature than the battery cells 270 thus allowing for heat to transfer from the battery cells 270 to the cell separator 280 (e.g., heat sink, etc.). This flow of heat between the battery cells 270 and the cell separator 280 may provide a cooling effect to the battery cells 270 such to prevent overheating. According to an example embodiment, the flow of heat between the battery cells 270 and the cell separator 280 may be at one of the flanges 370, the cell barrier 320, and the sidewalls 310, where heat flowing into the cell separator 280 is then routed out and away from the battery cells 270. Furthermore, the cell separator 280 may be configured as a barrier that is configured to prevent heat from transferring between adjacent battery cells 270.

Figure 7:
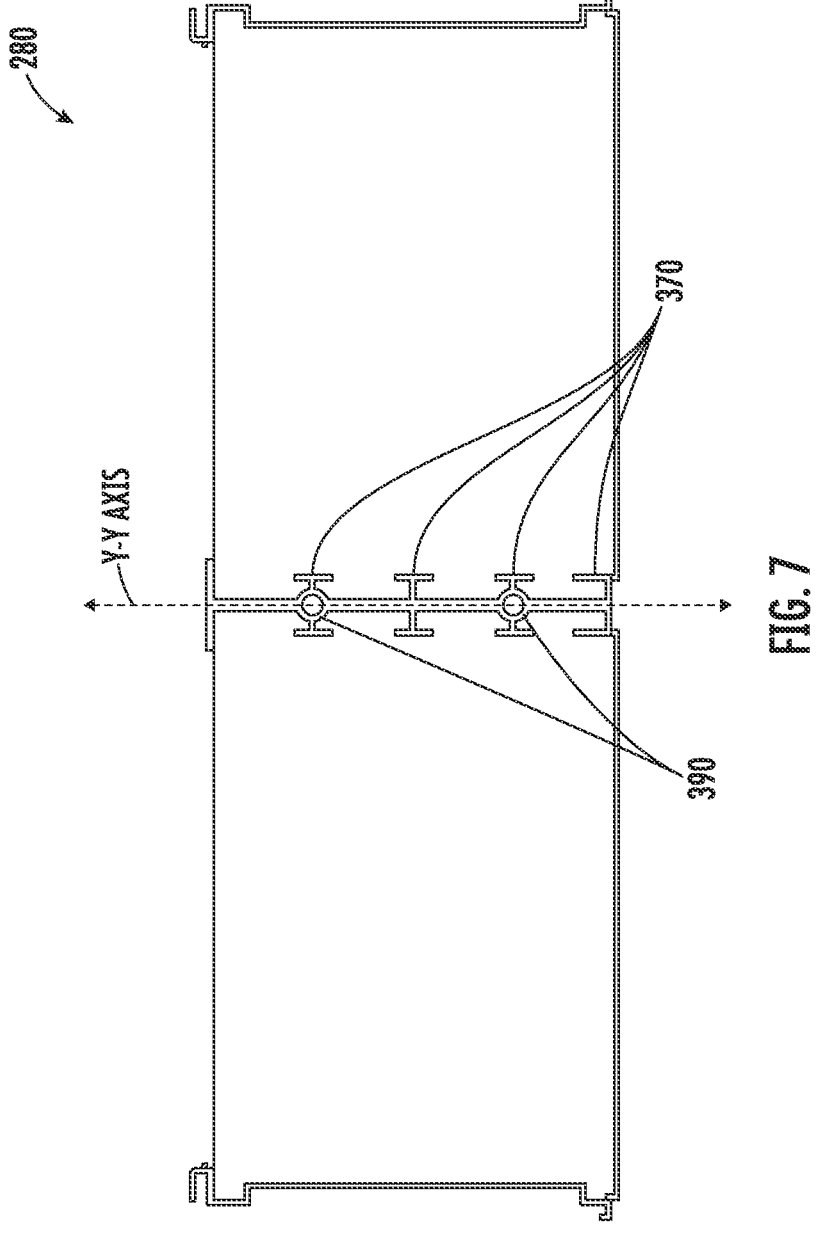
FIG. 7 is a front view of the cell separator of FIG. 6, according to an exemplary embodiment.

Referring now to FIG. 7, the cell separator 280 includes a vertical axis, shown as Y-Y axis 380. The Y-Y axis 380 may be positioned along the support structure 330 and extend along the vertical midpoint of the cell separator 280. In some embodiments, the Y-Y axis 380 may extend vertically away from a vertical midpoint of the support structure 330. According to the example embodiment, the cell separator 280 may be configured as being geometrically similar over the Y-Y axis 380. Effectively, the Y-Y axis 380 separates the cell separator 280 into the respective first battery cell bank 250 and second battery cell bank 260.

Referring still to FIG. 7, the cell separator may include one or more features designed to allow coupling of adjacent cell separators to each other, which may advantageously provide a modular construction for the battery module (e.g., allowing a number of cell separators to couple to each other to allow variation in the number of battery cells included in the module). For example, at least one of the flanges 370 include a female portion or receptacle, shown as receptacle 390. The receptacle 390 may be configured to receive a male portion or member (shown in FIG. 8 as pins 395, which will be discussed more fully below) from an adjacent cell separator to couple the cell separators 280 to one another. According to an example embodiment, the receptacle 390 may be configured to receive a peg or extension from an adjacent cell separator. In some embodiments, the receptacle 390 may include a ridge where interaction between the receptacle 390 and the male portion create a snap (e.g., button, etc.) interaction. The cell separator 280 may include two receptacles 390, positioned equidistant to the top and bottom of the cell separator 280. To be more precise, the cell separator 280 may include a first receptacle positioned a first distance away from a top of the cell separator 280, and a second receptacle positioned a second distance away from a bottom of the cell separator 280, where the first distance is the same as the second distance. In some embodiments, the first receptacle 390 may be positioned closer to the top of the cell separator 280 such that the first distance is smaller than the second distance. In still other embodiments, the first receptacle 390 may be positioned further from the top of the cell separator 280 such that the first distance is larger than the second distance. According to still other embodiments, a different number of receptacles may be utilized.

Figure 8:
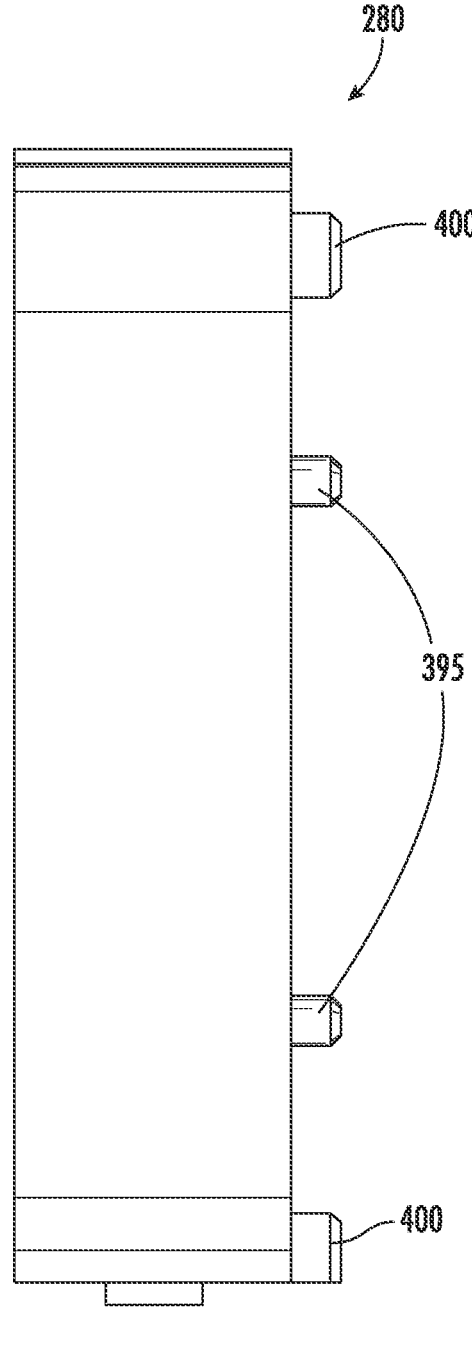
FIG. 8 is a side view of the cell separator of FIG. 6, according to an exemplary embodiment.
Figure 9:
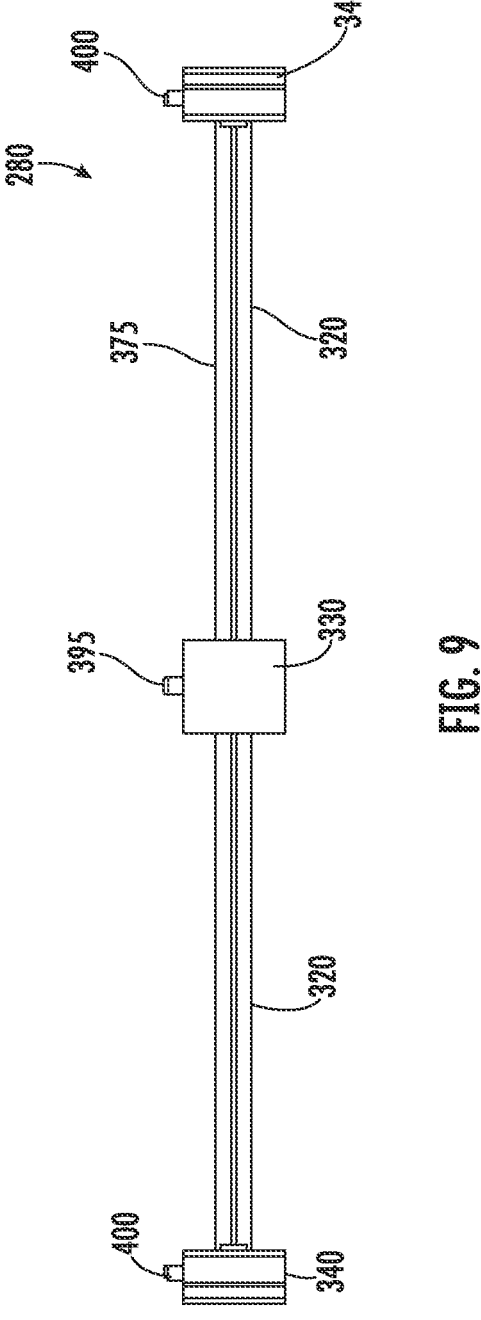
FIG. 9 is a top view of the cell separator of FIG. 6 according to an exemplary embodiment.

Referring now to FIGS. 8 and 9, the cell separator 280 further comprises pins 395. The pins 395 may be configured to couple with the receptacles 390 to provide structural rigidity to the battery module 100 and to couple adjacent cell separators together. The pins 395 may be extruded bosses that extend horizontally from at least the support structure 330. In some embodiments, the pins 395 may be ribbed bosses where the ribs prevent the pins 395 from becoming out of contact with the receptacles 390. By way of example, the number of pins 395 coupled to the cell separator 280 is the same as the number of receptacles 390 on the adjacent cell separator. While the coupling members are illustrated herein as receptacles 390 and pins 395, it should be noted that other structures may be used for the purpose of coupling adjacent cell separators together.

The cell separator 280 further comprises a receiving flange, shown as cell receiving flange 400. The cell receiving flange 400 may be coupled to at least one of the sidewalls 310 and may further extend horizontally away from the cell separator 280. The cell receiving flange 400 may be an extruded rectangular boss, circular boss, or any extruded flange configuration. The cell receiving flange 400 may be configured to couple to at least one of the interlocking mechanisms 340 when the cell separators 280 abut one another. According to an example embodiment, the cell separator 280 includes two cell receiving flanges 400 positioned adjacent one another and coupled to the sidewalls 310.

As can be appreciated, the battery module 100 may include any number of cell separators 280 with any respective number of battery cells 270 disposed within, so as to create a customizable battery module. For example, for applications that may require additional power needs, more cell separators 280 can be added to allow for an increased number of battery cells 270. In some embodiments, if additional power is required, the cell separators 280 may include additional battery cell banks with additional support structures disposed between the additional battery cell banks. In still some embodiments, if additional power is required, the cell separators 280 may be coupled together at the interlocking mechanisms 340 such to extend the amount of battery cell banks disposed within the battery module 100.

To assemble the battery module 100, battery cells 270 are first placed in the associated cell separator 280, and then coupled to an adjacent battery cell/cell separator assembly. The process is then repeated until the battery module includes the desired number of battery cells 270. Once the layers of the battery module 100 are assembled, the end plates, side plates, and covers may be coupled to complete the battery module.

Figure 10:
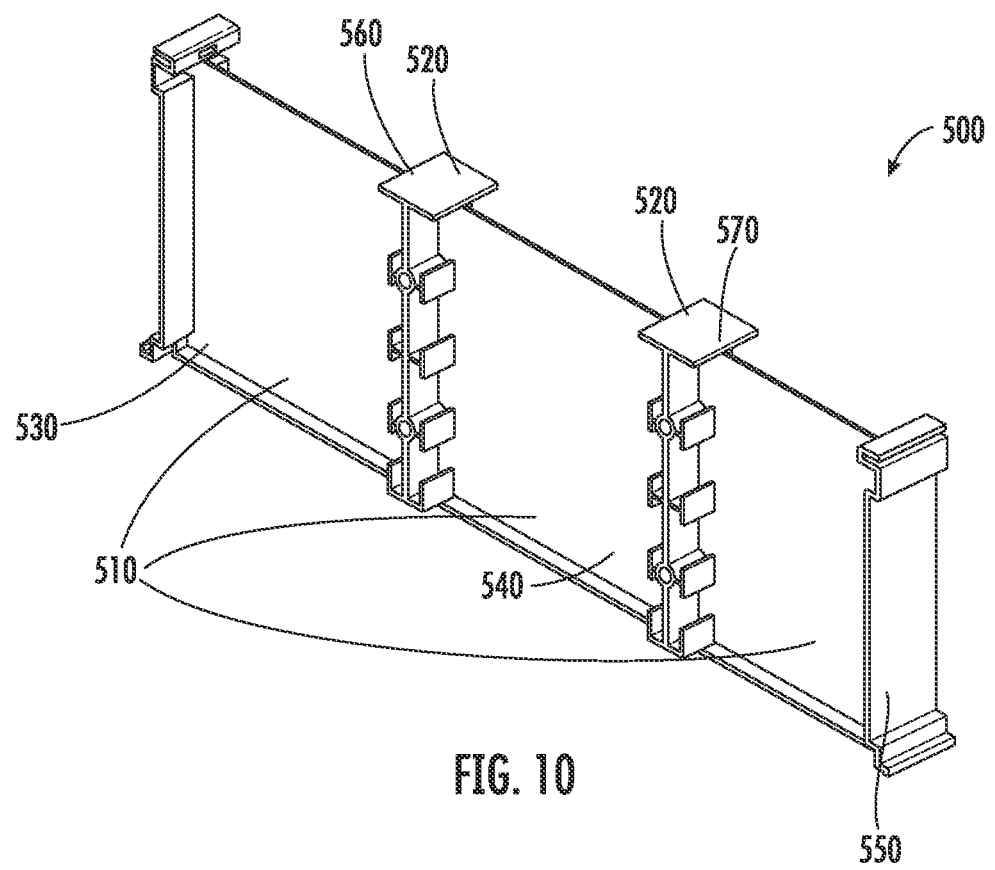
FIG. 10 is a perspective view of a cell separator, according to an exemplary embodiment.

While the foregoing embodiments illustrate a configuration in which a battery module includes two "rows" or "banks" of cells, with each cell separator having a single support structure, other configurations are possible so as to allow a different number of rows of cells. By way of example, and referring now to FIG. 10, a cell separator 500 is shown according to another embodiment to allow the production of a battery module having three "rows" or "banks" of cells. The cell separator 500 is substantially similar to the cell separator 280 such that similar components may be used to describe the cell separator 500. The cell separator 500 includes a plurality of cell barriers 510 and a plurality of support structures 520 positioned between the plurality of cell barriers 510. The plurality of cell barriers 510 include a first cell barrier 530, a second cell barrier 540, and a third cell barrier 550. The plurality of cell barriers 510 may be configured to provide at least one of thermal propagation and heat dissipation to the cell separator 500. The plurality of support structures 520 include a first support structure 560 and a second support structure 570. The first support structure 560 may be positioned between the first cell barrier 530 and the second cell barrier 540. The second support structure 570 may be positioned between the second cell barrier 540 and the third cell barrier 550. The plurality of support structures 520 may be configured to (a) provide structural rigidity to the cell separator 500, (b) separate battery cells coupled to the cell separator 500, and (c) provide thermal propagation between battery cells coupled to the cell separator 500.

The cell separator 500 may be configured to accommodate an additional battery cell, coupled to the third cell barrier 550. By way of example, when the cell separators 500 are assembled into a battery module, the battery module will include an additional battery cell bank. The additional battery cell bank is configured to be substantially similar to the first battery cell bank 250 and the second battery cell bank 260. When the cell separators 500 are assembled into the battery module, the battery module may effectively have more power than the battery module 100.

According to an example embodiment, at least one of the plurality of end plates 290 and 300 and the cell separator 280 may include additional structural components. To be more precise, at least one of the plurality of end plates 290 and 300 and the cell separator may include increased ribbing or structural supports configured to further stiffen the battery module 100. The ribbing or structural supports may be configured to dampen loading force applied to the battery module in the vertical direction, the horizontal direction, or a combination of the horizontal and vertical direction.

Figure 11:
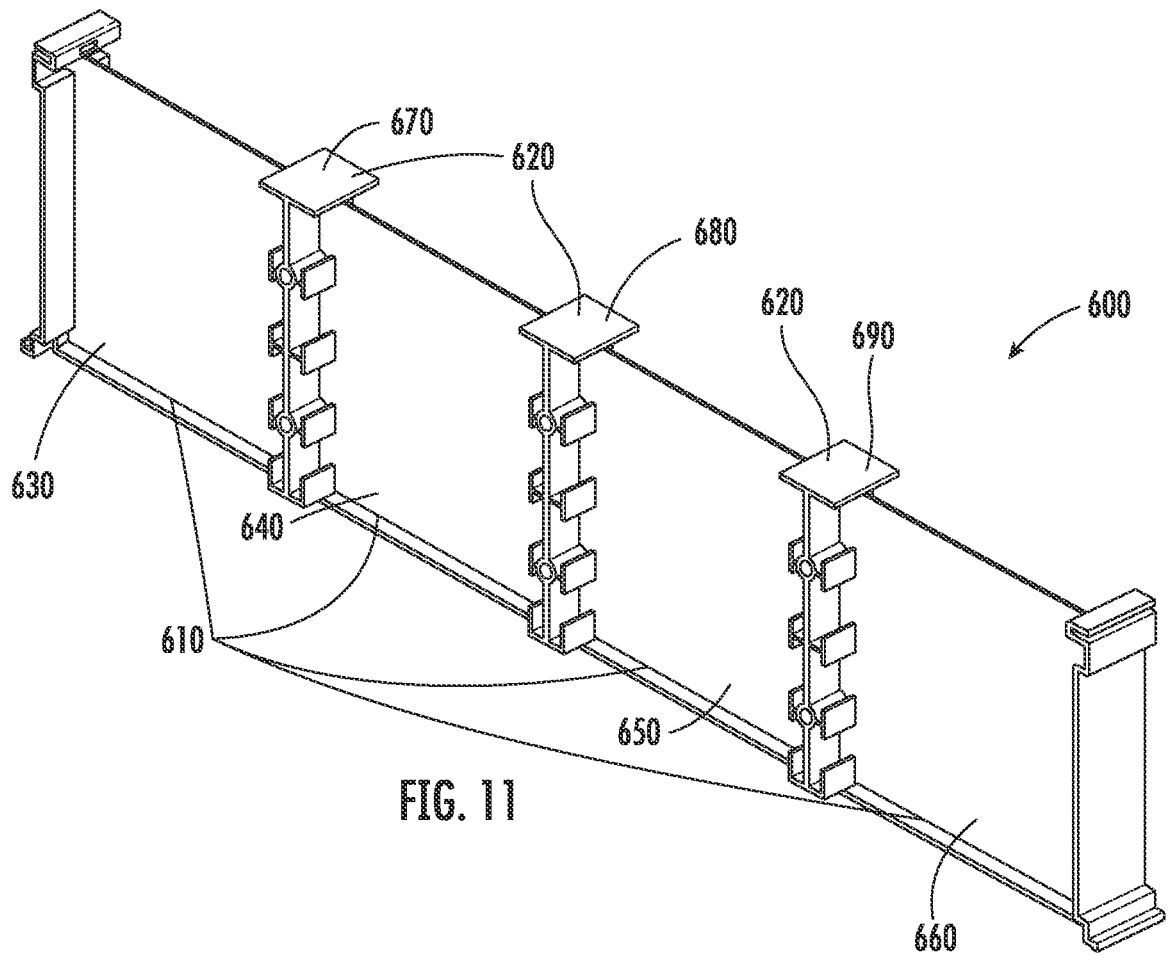
FIG. 11 is a perspective view of a cell separator, according to an exemplary embodiment.

Referring now to FIG. 11, a cell separator 600 is shown, according to an example embodiment, which allows for construction of a battery module having four "rows" or "banks" of cells. The cell separator 600 is configured to be substantially similar to the cell separators 280 and 500 such that similar components may be used to describe the cell separator 600. The cell separator 600 includes a plurality of cell barriers 610 and a plurality of support structures 620 positioned between the plurality of cell barriers 610. The plurality of cell barriers 610 include a first cell barrier 630, a second cell barrier 640, a third cell barrier 650, and a fourth cell barrier 660. The plurality of cell barriers 610 may be configured to provide at least one of thermal propagation and heat dissipation to the cell separator 600. The plurality of support structures 620 include a first support structure 670, a second support structure 680, and a third support structure 690. The first support structure 670 may be positioned between the first cell barrier 630 and the second cell barrier 640. The second support structure 680 may be positioned between the second cell barrier 640 and the third cell barrier 650. The third support structure 690 may be positioned between the third cell barrier 650 and the fourth cell barrier 660. The plurality of support structures 620 may be configured to (a) provide structural rigidity to the cell separator 600, (b) separate battery cells coupled to the cell separator 600, and (c) provide thermal propagation between battery cells coupled to the cell separator 600.

The cell separator 600 may be configured to an additional battery cell, coupled to at least one of the third cell barrier 650 and the fourth cell barrier 660. By way of example, when the cell separators 600 are assembled into a battery module, the battery module will include two additional battery cell banks. The additional battery cell banks may be substantially similar to at least one of the first battery cell bank 250 and the second battery cell bank 260. When the cell separators 600 are assembled into the battery module, the battery module may effectively have more power than the battery module 100.

While the foregoing embodiments illustrate a configuration in which a battery module includes two or more "rows" or "banks" of cells, with each cell separator having a single support structure, other configurations are possible so as to allow a different cell separator configuration. By way of example, and referring now to FIG. 12, a cell separator 700 is shown according to another embodiment to allow the production of a battery module to be a pouch design. Although not shown, the cell separator 700 may be configured for use in a pouch battery module. The cell separator 700 is substantially similar to the cell separator 280 such that similar components may be used to describe the cell separator 700. The cell separator 700 is shown, coupled to a single battery cell 710. According to an exemplary embodiment, the cell separator 700 may be coupled to more than one battery cell 710. Positioned proximate to the top of the battery cell 710 is a set of terminals, shown as battery cell terminals 720. The battery cell terminals 720 may be one of an anode terminal and a cathode terminal, where the battery cell terminals 720 are spaced apart from one another.

Figure 12:
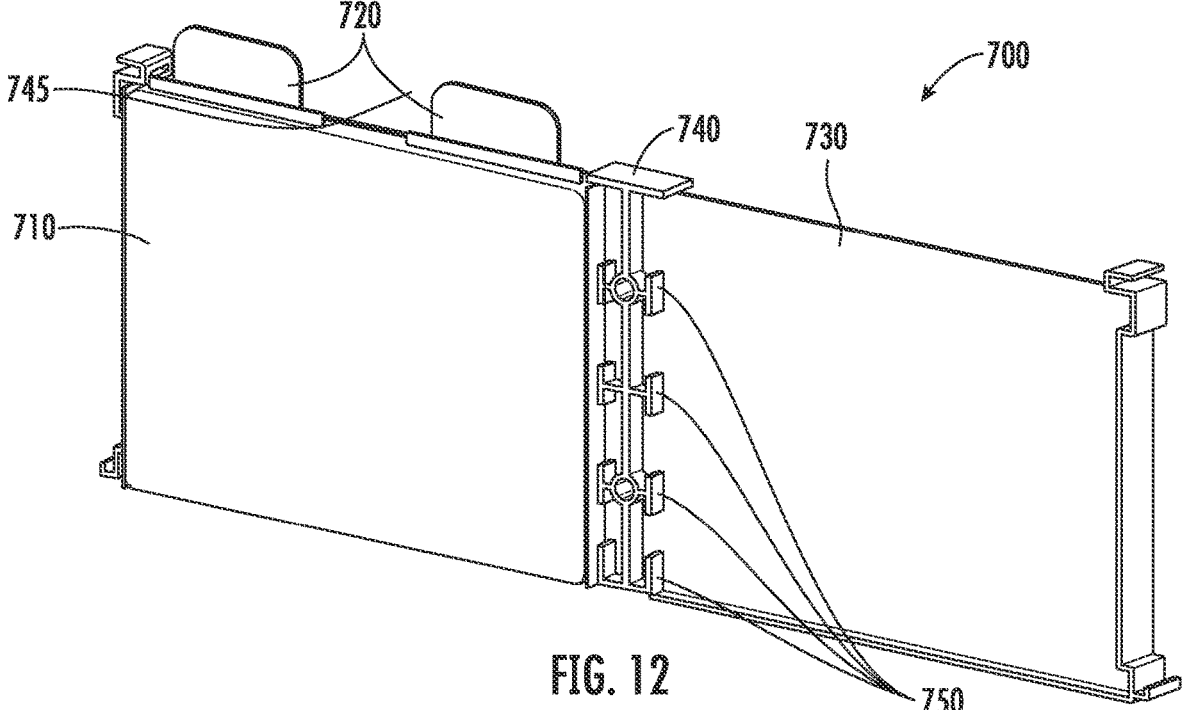
FIG. 12 is a perspective view of a cell separator used in a pouch battery module, according to an exemplary embodiment.

Referring still to FIG. 12, the cell separator 700 includes a barrier, wall, or structure, shown as cell barrier 730. The cell separator 700 may be configured to include two cell barriers 730, where the number of cell barriers 730 is determined on the number of cell "rows" or "banks" in the pouch battery module. Positioned between the cell barrier 730, proximate a midpoint of the cell separator 700, is a lateral structure, shown as support structure 740. The support structure 740 may be a lateral structure extending through at least a portion of the height of the cell separator 700. The support structure 740 may be configured to provide increased structural rigidity to the pouch battery module. By way of example, the support structure 740 may be configured to dampen forces introduced to the pouch battery module in at least one of the x-direction, y-direction, and z-direction. The cell barrier 730 may be configured to separate the individual battery cells 710 in the pouch battery module to prevent heat from transferring between adjacent battery cells 710 through one of the cell barrier 730 or the support structure 740.

Referring still to FIG. 12, positioned between the battery cell 710 and the cell barrier 730 is an adhesive 745. The adhesive 745 may be a layer configured to couple the battery cell 710 to the cell barrier. In some embodiments, the adhesive 745 may be configured to insulate the battery cell 710. Coupled to the support structure 740 is a plurality of flanges, shown as flanges 750. The flanges 750 may be uniformly positioned along the support structure 750, where the flanges 750 may provide support to the battery cell 710. As shown in FIG. 12, the cell separator 700 includes four flanges 750, but any number of flanges 750 may be coupled to the cell separator 700. The flanges 750 may be further configured to provide at least one of (a) structural rigidity, (b) mitigate thermal propagation, (c) thermal separation, and (d) battery cell 710 support when fully assembled.

Figure 13:
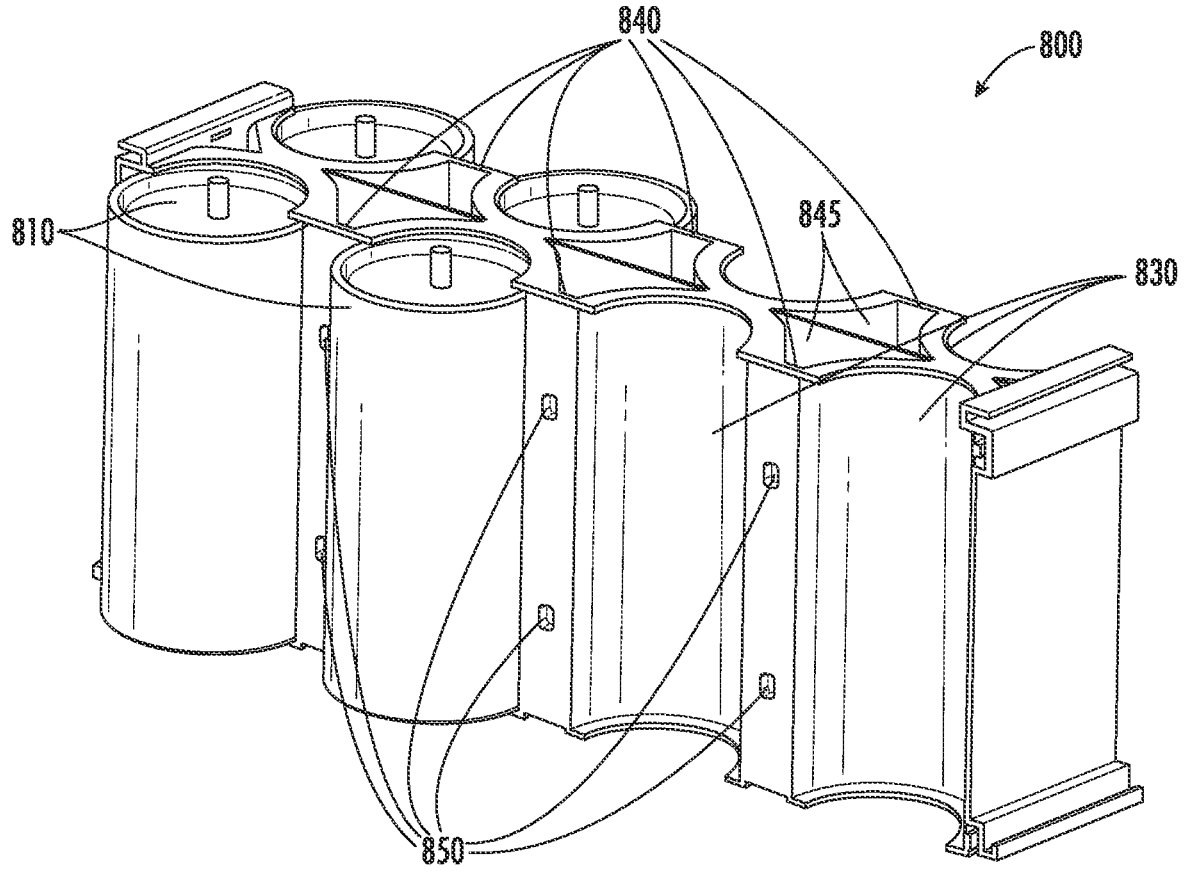
FIG. 13 is a perspective view of a cell separator used in a cylindrical battery module, according to an exemplary embodiment.

Referring now to FIG. 13, a cell separator 800 is shown, according to an example embodiment. The cell separator 800 is substantially similar to the cell separator 280 such that similar components may be used to describe the cell separator 800. Although not show, the cell separator 800 may be intended for use in a cylindrical battery module. The cell separator 800 is shown, coupled to at least one battery cell 810. According to an exemplary embodiment, the cell separator 700 may be coupled to more than one battery cell 810. The battery cell 810 may be configured to be a cylindrical battery cell 810. In some embodiments, the battery cell 810 may be any configuration (e.g., prismatic, etc.).

Referring still to FIG. 13, the cell separator 800 includes a barrier, wall, or structure, shown as cell barrier 830. The cell separator 800 may be configured to include at least one cell barrier 830, where the number of cell barriers 830 is determined on the number of cell "rows" or "banks" in the cylindrical battery module. As shown in FIG. 13, the cell separator 800 includes four cell barriers 830. The cell barrier 830 may be configured to be a curved (e.g., radiused, etc.) barrier that is configured to abut the battery cell 810. Positioned between the cell barrier 830 is a number of lateral structures, shown as support structures 840. The support structures 840 may be a lateral structure extending through at least a portion of the height of the cell separator 800. The support structures 840 may be configured to provide increased structural rigidity to the cylindrical battery module. By way of example, the support structures 840 may be configured to dampen forces introduced to the cylindrical battery module in at least one of the x-direction, y-direction, and z-direction. The cell barrier 830 may be configured to separate the individual battery cells 810 in the cylindrical battery module to prevent heat from transferring between adjacent battery cells 810 through one of the cell barrier 830 or the support structures 840.

Referring still to FIG. 13, the cell separator 800 includes a number of hollow structures or concave portions, shown as hollow portions 845. The hollow portions 845 may be positioned between cell barriers 830 opposite one another and extend through at least a portion of the height of the cell separator 800. According to an example embodiment, the hollow portions 845 may be filled with insulation, material, or remain empty portions. Referring still to FIG. 13, coupled to the support structures 840 is a number of receiving portions 850. The receiving portions 850 may be coupled to at least one of the support structures 840. In some embodiments, the receiving portions 850 may be coupled to all of the support structures 840. Although not shown, the receiving portions 850 may be configured to receive a peg, extrusion, male portion, etc. from another cell separator 800 to couple one cell separator 800 to another. In such an embodiment, when one cell separator 800 is coupled to another, the battery cell 810 is completely surrounded such that the battery cell 810 is tightly held in the cylindrical battery module. The combination of the cell barrier 830 and support structures 840 may be further configured to provide at least one of (a) structural rigidity, (b) mitigate thermal propagation, (c) thermal separation, and (d) battery cell 810 support when fully assembled.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "example" and variations thereof, as used herein to describe various embodiments, are intended to indicate that such embodiments are possible examples, representations, and/or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," etc.) are merely used to describe the orientation of various elements in the FIG-URES. It should be noted that the orientation of various elements may differ according to other example embodi-ments, and that such variations are intended to be encom-passed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

It is important to note that the construction and arrange-ment of the cell separator as shown in the various example embodiments is illustrative only. Although only a few embodiments have been described in detail in this disclo-sure, those skilled in the art who review this disclosure will readily appreciate that many modifications are possible (e.g., variations in sizes, dimensions, structures, shapes and pro-portions of the various elements, values of parameters, mounting arrangements, use of materials, colors, orienta-tions, etc.) without materially departing from the novel teachings and advantages of the subject matter described herein. For example, the position of elements may be reversed or otherwise varied, and the nature or number of discrete elements or positions may be altered or varied. Any element disclosed in one embodiment may be incorporated or utilized with any other embodiment disclosed herein. Although one example of an element that can be incorpo-rated or utilized in another embodiment has been described above, it should be appreciated that other elements of the various embodiments may be incorporated or utilized with any of the other embodiments disclosed herein.

What is claimed is:

1. A battery module, comprising:
a first side rail;
a second side rail;
one or more battery cell banks positioned between the first side rail and the second side rail; and
one or more battery cell separators positioned within the one or more battery cell banks and configured to separate one or more battery cells positioned adjacent one another, the one or more battery cell separators comprising:
one or more cell barriers positioned adjacent the one or more battery cell banks; and
a support structure positioned between the one or more cell barriers, the support structure disposed along a midpoint of the one or more battery cell separators, wherein the support structure comprises:

a male portion and a female portion, the male portion and female portion disposed on opposite sides of the support structure and spaced vertically from top and bottom portions of the support structure; and
a plurality of flanges extending from the support structure, each of the plurality of flanges extend-ing in a direction substantially perpendicular to a longitudinal axis of the support structure and parallel to a plane defined by the one or more cell barriers;
wherein the one or more battery cell separators are configured to mitigate thermal energy propagation pro-duced from the one or more battery cells.

2. The battery module of claim 1, wherein the one or more battery cell separators further comprises:
a plurality of sidewalls;
and
a bottom support extending along a portion of a length of the battery cell separator and extending outward from the one or more cell barriers.

3. The battery module of claim 2, wherein the one or more flanges, the bottom support, the one or more cell barriers, and the plurality of sidewalls cooperatively define an area for the one or more battery cells to be positioned therein.

4. The battery module of claim 1, wherein the support structure is configured to dampen impact forces onto the one or more battery cell separators.

5. The battery module of claim 1, wherein the one or more battery cell separators are manufactured out of a conductive material, and wherein the one or more battery cell separators direct the thermal energy towards a heat sink located proxi-mate a bottom of the battery module.

6. The battery module of claim 1, wherein one of the one or more battery cell separators comprises two cell barriers.

7. The battery module of claim 1, wherein the one or more battery cell separators further comprises an interlocking mechanism coupled to an end of the one or more cell barriers, and wherein the interlocking mechanism is config-ured to receive a portion of the first side rail to couple the one or more battery cell separators to the battery module.

8. The battery module of claim 1, wherein the one or more battery cell separators further comprises a first battery cell separator and a second battery cell separator, and wherein the female portion is configured to receive a male portion of the first battery cell separator to couple the first battery cell separator to the second battery cell separator.

9. A battery module, comprising:
a plurality of side rails;
one or more battery cell banks positioned between the plurality of side rails, the one or more battery cell banks comprising one or more battery cells positioned therein; and
one or more battery cell separators positioned within the one or more battery cell banks and configured to separate the one or more battery cells positioned adja-cent one another, the one or more battery cell separators comprising:
a plurality of sidewalls;
one or more cell barriers positioned adjacent the one or more battery cell banks;
a bottom support extending along a portion of a length of the battery cell separator and extending outward from the one or more cell barriers;
a support structure positioned between the one or more cell barriers, the support structure disposed along a midpoint of the one or more battery cell, wherein the support structure comprises a male portion and a female portion, the male portion and female portion disposed on opposite sides of the support structure and spaced vertically from top and bottom portions of the support structure;

and one or more flanges extending from the support structure, each of the one or more flanges extending in a direction substantially perpendicular to a longitudinal axis of the support structure and parallel to a plane defined by the one or more cell barriers;

wherein the one or more flanges, the bottom support, the one or more cell barriers, and the plurality of sidewalls cooperatively define an area for a battery cell to be positioned therein.

10. The battery module of claim 9, wherein the one or more battery cell separators further comprises an interlocking mechanism coupled to an end of the one or more cell barriers, and wherein the interlocking mechanism is configured to receive a portion of the plurality of side rails to couple the one or more battery cell separators to the battery module.

11. The battery module of claim 9, wherein the one or more battery cell separators are configured to mitigate thermal energy propagation produced from the one or more battery cells.

12. The battery module of claim 9, wherein the one or more battery separators comprises a plurality of battery separators.

13. The battery module of claim 12, wherein each of the plurality of battery separators is structured to couple to an adjacent battery separator.

14. The battery module of claim 13, wherein each of the one or more flanges of each of the plurality of battery separators is structured to include the female portion, the female portion comprising at least one receptacle, the at least one receptacle structured to receive the male portion of the adjacent battery separator, the male portion comprising a pin.

15. The battery module of claim 14, wherein the at least one receptacle is structured to include a ridge such that the ridge creates a snap interaction with the pin.

16. The battery module of claim 15, wherein the at least one receptacle comprises two receptacles.

17. The battery module of claim 16, wherein a first of the two receptacles is positioned at a first distance from a top portion of each of the plurality of battery separators and a second of the two receptacles is positioned at a second distance from a bottom portion of each of the plurality of battery separators.

18. The battery module of claim 14, wherein the one or more flanges comprises four flanges.

19. The battery module of claim 9, wherein each of the plurality of sidewalls includes a plurality of slots, the plurality of slots structured to receive a portion of the plurality of side rails.

20. The battery module of claim 14, wherein the pin is structured as a ribbed boss extending horizontally from the support structure.

* * * * *